(12) United States Patent
Schleif et al.

(10) Patent No.: US 10,908,049 B2
(45) Date of Patent: **\*Feb. 2, 2021**

(54) METHODS AND SYSTEMS FOR MONITORING ROTOR BLADES IN TURBINE ENGINES

(71) Applicant: General Electric Company, Schenectady, NY (US)

(72) Inventors: Kurt Kramer Schleif, Greenville, SC (US); Michael Allen Ball, Greer, SC (US); Mario Joseph Arceneaux, Greenville, SC (US); Andrew David Ellis, Greenville, SC (US); Vincent Carmona, Birr (CH)

(73) Assignee: General Electric Company, Schenectady, NY (US)

( \* ) Notice: Subject to any disclaimer, the term of this patent is extended or adjusted under 35 U.S.C. 154(b) by 150 days.

This patent is subject to a terminal disclaimer.

(21) Appl. No.: 16/200,834

(22) Filed: Nov. 27, 2018

(65) Prior Publication Data

US 2020/0166431 A1 May 28, 2020

(51) Int. Cl.
| | |
|---|---|
| *G01M 15/14* | (2006.01) |
| *F02C 7/32* | (2006.01) |
| *F01D 5/14* | (2006.01) |
| *G01H 9/00* | (2006.01) |

(52) U.S. Cl.
CPC .............. *G01M 15/14* (2013.01); *F01D 5/14* (2013.01); *F02C 7/32* (2013.01); *G01H 9/00* (2013.01); *F05D 2220/32* (2013.01); *F05D 2260/83* (2013.01); *F05D 2260/96* (2013.01)

(58) Field of Classification Search
CPC . G01M 15/14; F02C 7/32; F01D 5/14; G01H 9/00; F05D 2260/96; F05D 2220/32; F05D 2260/83
See application file for complete search history.

(56) References Cited

U.S. PATENT DOCUMENTS

| | | | | |
|---|---|---|---|---|
| 8,111,161 | B2* | 2/2012 | Lee | F01D 17/02 |
| | | | | 340/10.1 |
| 10,091,562 | B2* | 10/2018 | Mantese | H04W 12/04 |
| 10,469,920 | B2* | 11/2019 | Zacchio | H04L 12/40045 |
| 10,484,760 | B2* | 11/2019 | Mantese | F02C 9/00 |

(Continued)

*Primary Examiner* — Freddie Kirkland, III
(74) *Attorney, Agent, or Firm* — Charlotte C. Wilson; James W. Pemrick

(57) ABSTRACT

A method for determining an arrival-time of a rotor blade that includes attaching an RF reader to a stationary surface and an RF tag to the rotor blade. Strength-of-signal data points are collected via an RF monitoring process that includes: emitting an RF signal from the RF reader; receiving the RF signal at the RF tag and emitting a return RF signal by the RF tag in response thereto; receiving the return RF signal at the RF reader; measuring a signal strength of the return RF signal as received by the RF reader; and determining the strength-of-signal data point as being equal to the measured signal strength. The RF monitoring process is repeated until multiple strength-of-signal data points are collected. A maximum strength-of-signal is determined from the multiple strength-of-signal data points, and the arrival-time for the rotor blade is determined as being a time that corresponds to the maximum strength-of-signal.

20 Claims, 8 Drawing Sheets

(56) References Cited

U.S. PATENT DOCUMENTS

| | | | |
|---|---|---|---|
| 10,677,088 B2* | 6/2020 | Lee | F03D 17/00 |
| 2020/0165934 A1* | 5/2020 | Schleif | F01D 21/003 |
| 2020/0166432 A1* | 5/2020 | Schleif | G01H 9/00 |

* cited by examiner

METHODS AND SYSTEMS FOR MONITORING ROTOR BLADES IN TURBINE ENGINES

BACKGROUND OF THE INVENTION

This present application relates generally to methods and systems for improving the efficiency and operation of turbine engines, which, as used herein, is meant to include all types of turbine or rotary engines, including gas turbines, steam turbine engines, and others. More specifically, but not by way of limitation, the present application relates to methods and systems for monitoring rotor blades, including the vibrational response thereof via blade timing.

Turbine engines include rows of rotor blades interact with a high-velocity working fluid that causes the blades to rotate about a central axis. Such blades are exposed to the harsh conditions within the engine and must endure extreme mechanical and thermal loads during engine operation. Because of this, the design of rotor blades is an exacting challenge. New rotor blade designs must be effectively validated through rigorous upfront testing. Further, during use, the health of rotor blades must be monitored closely. The failure of a rotor blade during operation can cause catastrophic damage to a turbine engine. Such blade failures can be predicted and, thereby, avoided through rigorous upfront testing and/or health monitoring that accurately detects blade degradation or defects. For example, anomalies in the vibrational response of rotor blades to operating conditions can be an indicator of high strain levels or crack formation in the blades.

One common approach to measuring the vibrational response of rotor blades during operation is known as blade tip timing or, as used herein, "blade timing". Generally, though, the availability of such testing is somewhat limited due to the high cost associated with it. Further, given the limitations associated with known methods of measuring blade timing, the data can often be unreliable. Of course, one alternative is to shut down the turbine engine to visually inspect the rotor blades for defects. This type of inspection, though, has its own drawbacks in that it provides no information about the stresses occurring during operation, is also prone to unreliability, and is costly due to the labor requirements and need to shut down the engine. As a result, there is a continuing need for improved methods and systems pertaining to rotor blade monitoring and diagnostics, particularly as it relates to improving the cost-effectiveness and reliability of blade timing techniques.

BRIEF DESCRIPTION OF THE INVENTION

The present application thus describes methods and systems for determining an arrival-time of a rotor blade that include having an RF reader attached to a stationary surface in the turbine engine and an RF tag attached to the rotor blade. During turbine engine operation, strength-of-signal data points may be collected via an RF monitoring process, that includes: emitting an RF signal from the RF reader; receiving the RF signal at the RF tag and emitting a return RF signal by the RF tag in response thereto; receiving the return RF signal at the RF reader; measuring a signal strength of the return RF signal as received by the RF reader; and determining the strength-of-signal data point as being equal to the measured signal strength. The RF monitoring process may be repeated until multiple strength-of-signal data points are collected. Then a maximum strength-of-signal may be determined from the multiple strength-of-signal data points, and the arrival-time for the rotor blade may be determined as being a time that corresponds to the maximum strength-of-signal.

These and other features of the present application will become apparent upon review of the following detailed description of the preferred embodiments when taken in conjunction with the drawings and the appended claims.

BRIEF DESCRIPTION OF THE DRAWINGS

These and other objects and advantages of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
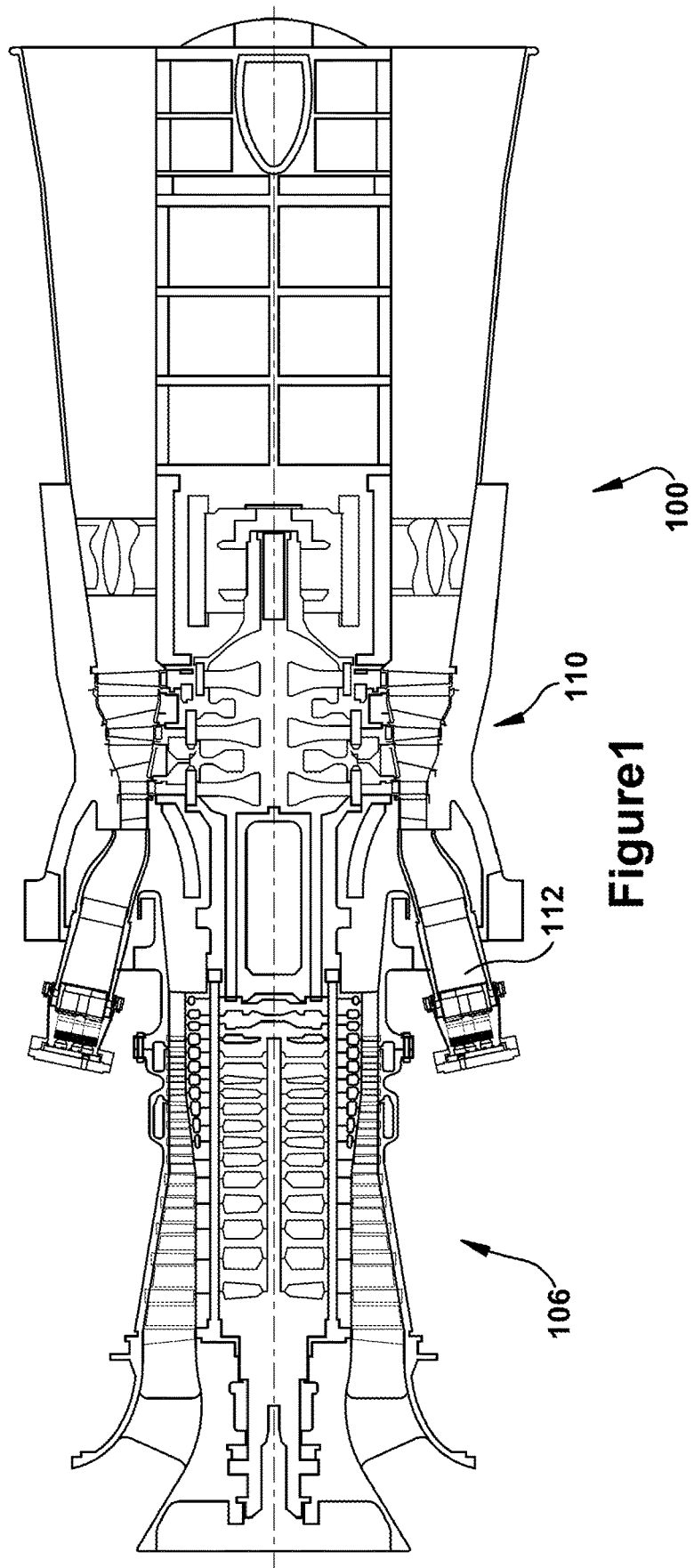
FIG. 1 is a schematic representation of an exemplary gas turbine engine in which embodiments of the present application may be used.

By way of background, FIG. 1 illustrates a schematic representation of a gas turbine engine 100. In general, gas turbine engines operate by extracting energy from a pressurized flow of hot gas that is produced by the combustion of a fuel in a stream of compressed air. As illustrated in FIG. 1, gas turbine engine 100 may be configured with an axial compressor 106 that is mechanically coupled by a common shaft or rotor to a downstream turbine section or turbine 110, and a combustor 112 positioned between the compressor 106 and the turbine 110. Note that the invention of the following disclosure may be used in all types of turbine engines, including gas turbine engines, steam turbine engines, aircraft engines, and others. Hereinafter, the invention will be described in relation to a gas turbine engine. This description is exemplary only and not intended to be limiting in any way.

Figure 2:
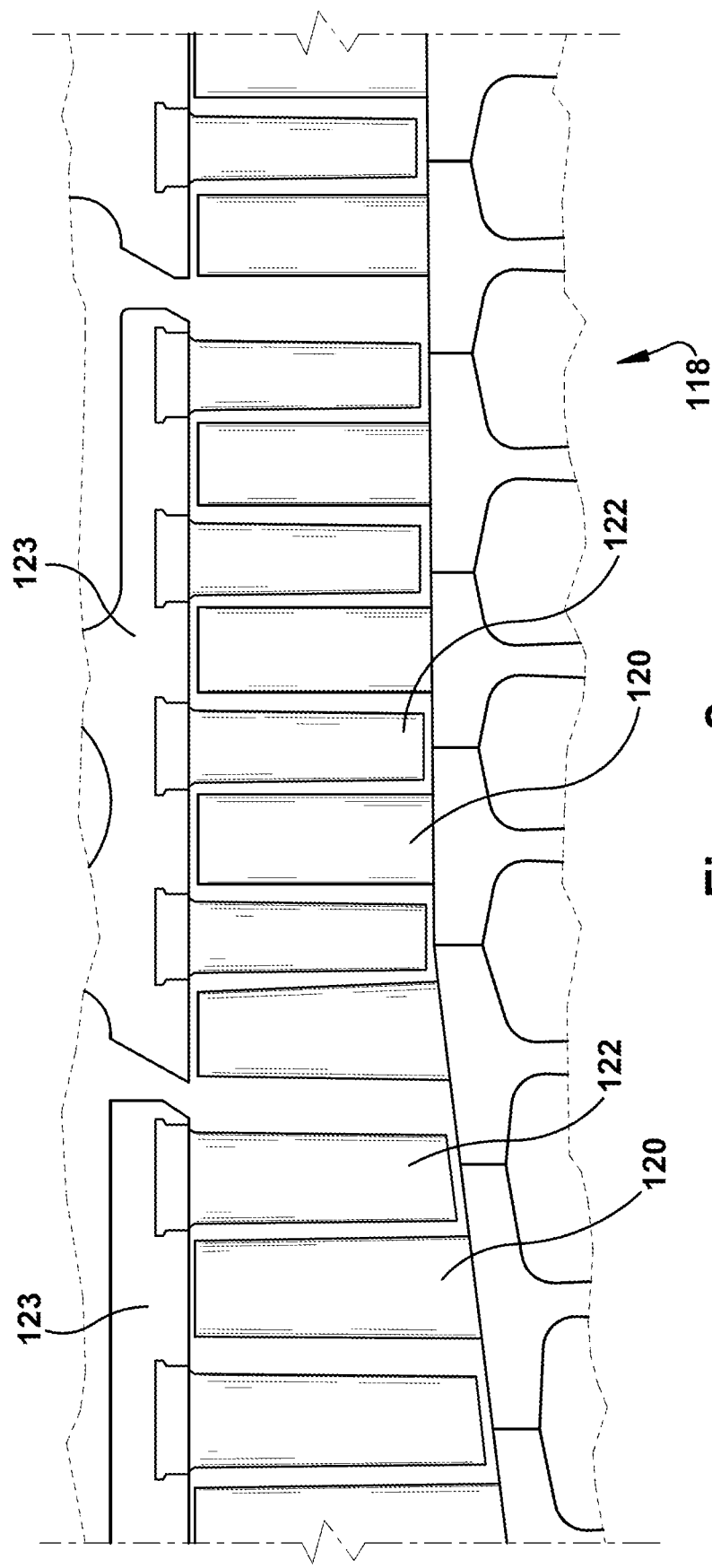
FIG. 2 is a sectional view of a compressor in a gas turbine engine in which embodiments of the present application may be used.

FIG. 2 illustrates a view of an exemplary multi-staged axial compressor 118 that may be used in a gas turbine engine. As shown, the compressor 118 may include a plurality of stages. Each stage may include a row of compressor rotor blades 120 followed by a row of compressor stator blades 122. Thus, a first stage may include a row of compressor rotor blades 120, which rotate about a central shaft, followed by a row of compressor stator blades 122, which remain stationary during operation. The compressor stator blades 122 generally are circumferentially spaced one from the other and fixed about the axis of rotation. The compressor stator blades 122 generally extend from an attachment with a compressor casing 123. The compressor rotor blades 120 are circumferentially spaced and attached to the shaft such that when the shaft rotates during operation, the compressor rotor blades 120 rotate about it. As one of ordinary skill in the art will appreciate, the compressor rotor blades 120 are configured such that, when spun about the shaft, they impart kinetic energy to the air or working fluid flowing through the compressor 118. The compressor 118 may have many other stages beyond the stages that are illustrated in FIG. 2. Additional stages may include a plurality of circumferential spaced compressor rotor blades 120 followed by a plurality of circumferentially spaced compressor stator blades 122.

Figure 3:
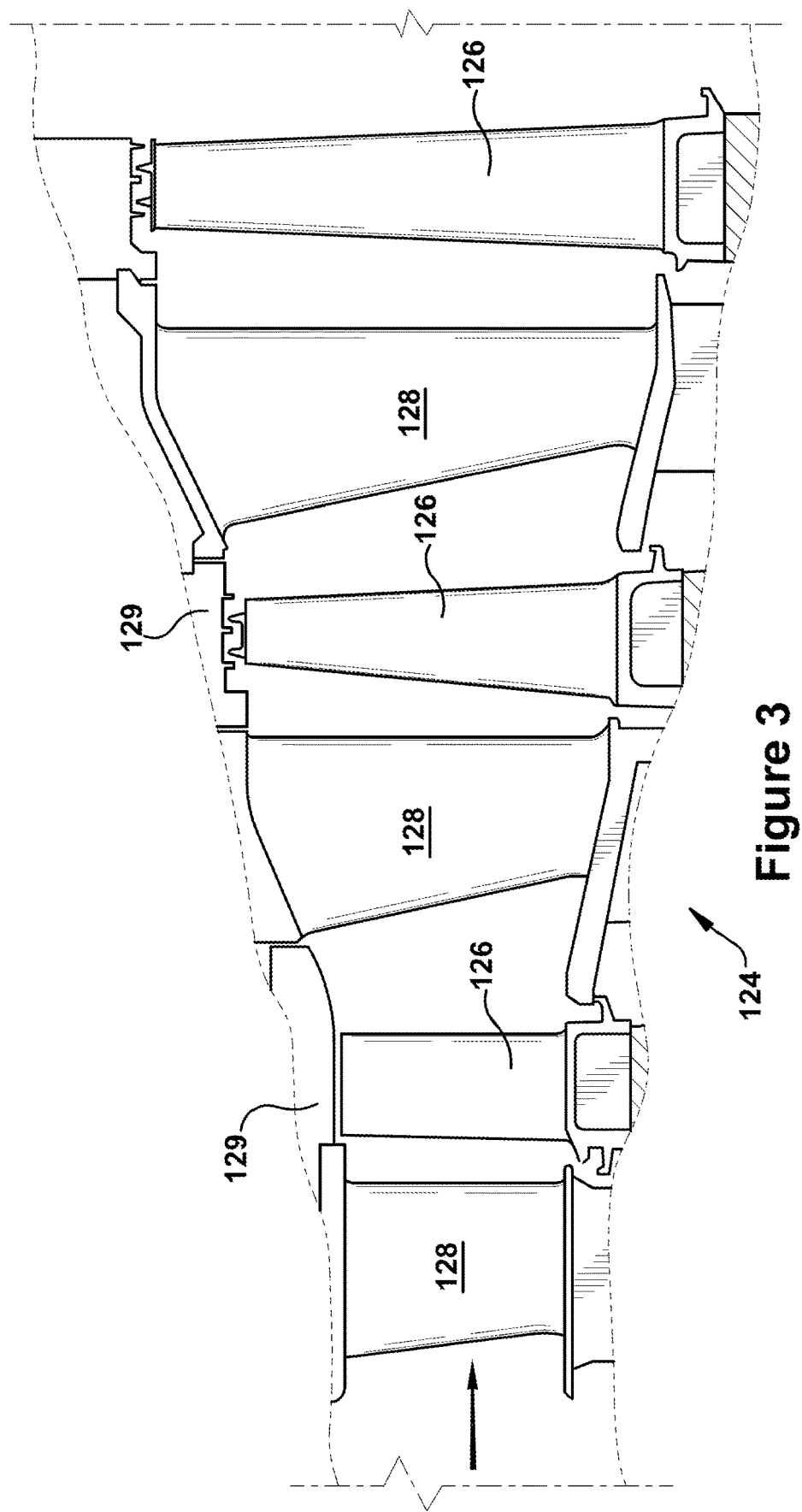
FIG. 3 is a sectional view of a turbine in a gas turbine engine in which embodiments of the present application may be used.

FIG. 3 illustrates a partial view of an exemplary turbine section or turbine 124 that may be used in the gas turbine engine. The turbine 124 also may include a plurality of stages. Three exemplary stages are illustrated, but more or less stages may be present in the turbine 124. A first stage includes a plurality of turbine buckets or rotor blades 126, which rotate about the shaft during operation, and a plurality of nozzles or turbine stator blades 128, which remain stationary during operation. The turbine stator blades 128 generally are circumferentially spaced one from the other and fixed about the axis of rotation. The turbine stator blades 128 generally extend from an attachment with a surrounding turbine casing 129. The turbine rotor blades 126 may be mounted on a turbine disc or wheel (not shown) for rotation about the central axis or shaft (not shown). Second and third stage of the turbine 124 also are illustrated, each of which includes a plurality of circumferentially spaced turbine stator blades 128 followed by a plurality of circumferentially spaced turbine rotor blades 126, which are also mounted on a turbine wheel for rotation. It will be appreciated that the turbine stator blades 128 and turbine rotor blades 126 lie in the hot gas path of the turbine 124. The direction of flow of the hot gases through the hot gas path is indicated by the arrow. As one of ordinary skill in the art will appreciate, the turbine 124 may have many other stages beyond that shown in FIG. 3.

In use, the rotation of compressor rotor blades 120 within the axial compressor 118 may compress a flow of air. In the combustor 112, energy may be released when that compressed air is mixed with a fuel and ignited. The resulting flow of hot gases from the combustor 112 then may be directed over the turbine rotor blades 126, which may induce the rotation of the turbine rotor blades 126 about the shaft, thus transforming the energy of the hot flow of gases into the mechanical energy of the rotating blades and, because of the connection between the rotor blades in the shaft, the rotating shaft. The mechanical energy of the shaft may then be used to drive the rotation of the compressor rotor blades 120, such that the necessary supply of compressed air is produced, and also, for example, a generator to produce electricity.

As discussed above, it is important for rotor blades to be tested and monitored closely, as blade health affects engine efficiency and performance and a failure of even a single blade can cause severe damage. Such consequences can be avoided if data indicative of strain levels, crack formation, and other rotor blade defects can be accurately collected and monitored. Generally, though, the availability of such data is limited due to the expense of collecting it. Further, given conventional collection methods, the data can prove unreliable. As a result, there is a continuing need for enhanced methods and systems pertaining to rotor blade monitoring and diagnostics, particularly as it relates to improving the cost-effectiveness and reliability of blade timing techniques.

Toward this objective, the present disclosure proposes to integrate certain aspects of radio frequency identification (or "RFID") technology into particular methods and systems for monitoring rotating blades in turbine engine, for example, gas and steam turbines. By way of background, radio frequency identification or RFID tagging is a known method of identification, and various RFID structures, circuits, and programming protocols are known in the art and commercially available. While early RFID systems were developed utilizing relatively large package sizes, which limited the products on which they could be used, more recent RFID tags have become much smaller so that they may be readily incorporated in a variety of products and applications. A conventional RFID system may include a radio frequency (or "RF") reader that produces or emits an RF signal to create an interrogation field. The RFID system also includes one or more RF tags, each of which may include a semiconductor chip having RF circuits, logic, memory, and/or an antenna. The RF tags function in response to the RF signal emitted by the RF reader. That is, when the RF tag enters the interrogation field created by the RF reader, an RF inlay in the RF tag becomes stimulated and induces the RF tag to emit a return RF signal that is then received by the RF reader. The return RF signal may be demodulated by the RF reader to recover information stored in the RF tag.

RF tags may be characterized as "active" or "passive". Active RF tags use internal batteries to power their circuits. An active tag also uses its battery to broadcast radio waves to an RF reader. Active tags generally broadcast high frequencies from 850 MHz to 5.8 GHz that can be read 100 feet or more away by the RF reader. Passive RF tags rely on the RF reader as their power source. Passive RF tags are generally read at closer distances and have lower production costs. In general, either tag works in the same way: 1) data stored within an RF tag's microchip waits to be read; 2) the tag's antenna receives electromagnetic energy from an RFID RF reader's antenna; 3) using power from its internal battery—in the case of active tags—or power harvested from the electromagnetic field created by the RF signal emitted by the RF reader—in the case of passive tags—the RF tag sends radio waves back to the RF reader; and 4) the RF reader receives the return signal from the RF tag and interprets the frequencies as meaningful data.

The present application relates to a type of rotor blade testing or monitoring known as blade tip timing, which will be referred to herein as "blade timing". Blade timing is a technique that measures the precise time of arrival (or simply, "arrival-time") of a rotor blade when the rotor blade reaches predetermined location in the rotational path the rotor blade makes within the engine. In general, blade timing functions by detecting small variations in the time it takes for a rotor blade to "arrive" at the defined location. From these small variations, the vibrational response of the rotor blade can be calculated.

To measure arrival-time, conventional blade timing techniques generally rely on sensors capable of detecting the passing rotor blade and, from that, determine the precise time the rotor blade arrives at the defined location. To be successful, this must be done with extremely high time resolution. Most common approaches employ laser or light probes, while other known techniques use capacitance probes, magnetic pick-ups, reluctance probes, or other sensors capable of detecting the presence of a passing rotor blade. Conventional blade timing methods, thus, generally rely a stationary sensing device or probe that detects the rotor blade to determine the timing of its arrival, or its arrival-time. Using an array of such sensors, the collected arrival-time data can be post-processed via known algorithms to calculate the vibrational response of the rotor blade, including its frequency and amplitude, as the turbine engine operates.

However, there are several shortcomings with traditional blade timing techniques. For example, they can be difficult and costly to implement and the data they produce can be unreliable. Once reason for this is the frequent absence of a definitive triggering feature on a rotor blade. That is, known blade timing techniques function by detecting the arrival of the rotor blade by detecting the arrival of a specific recognizable part or feature (i.e., "triggering feature") on the passing rotor blade. As will be appreciated, it is necessary for such triggering features to be a distinct, unmistakable surface feature that is present on each of the rotor blades and detectable by the sensor with high time resolution. This is needed because, in order to post-process time domain signals, the data stream must have a distinctive, fast-acting, sizable variation that can be used by the algorithms. In many cases, rotor blades lack this type of feature. This is made worse when several such triggering features are needed on each rotor blade, as often blade timing data can be enhanced if the arrival-time for multiple areas on each rotor blade is measured.

When suitable triggering features are not available on the rotor blade, the blade may have to be modified to create them. Such modifications, however, are typically costly and can be time consuming to produce and result in physical degradation to the rotor blade that shortens its usable life. Thus, these types of modification are undesirable, yet they are often unavoidable given the lack of available alternatives.

In addition, the laser probes and other sensors that are typically used in conventional blade timing systems are typically expensive and application-specific (i.e., not interchangeable or reusable). Further, due to the extreme temperatures and operating conditions within a turbine engine, the sensor hardware must be air-cooled during operation, which increases implementation costs and makes extended use impractical.

Turning to the present disclosure, systems and methods are proposed that use aspects of RFID technology to perform blade timing. As will be seen, embodiments of the present disclosure may collect arrival-time data, which is usable in standard post-processing algorithms, in a manner that improves data accuracy and reliability. Further, because the systems and methods of the present disclosure eliminate the need for expensive probes and air cooling, as well as the need for triggering features, blade timing may be more cost-effective and flexibly applied across different turbine engine sizes and types.

Figure 4:
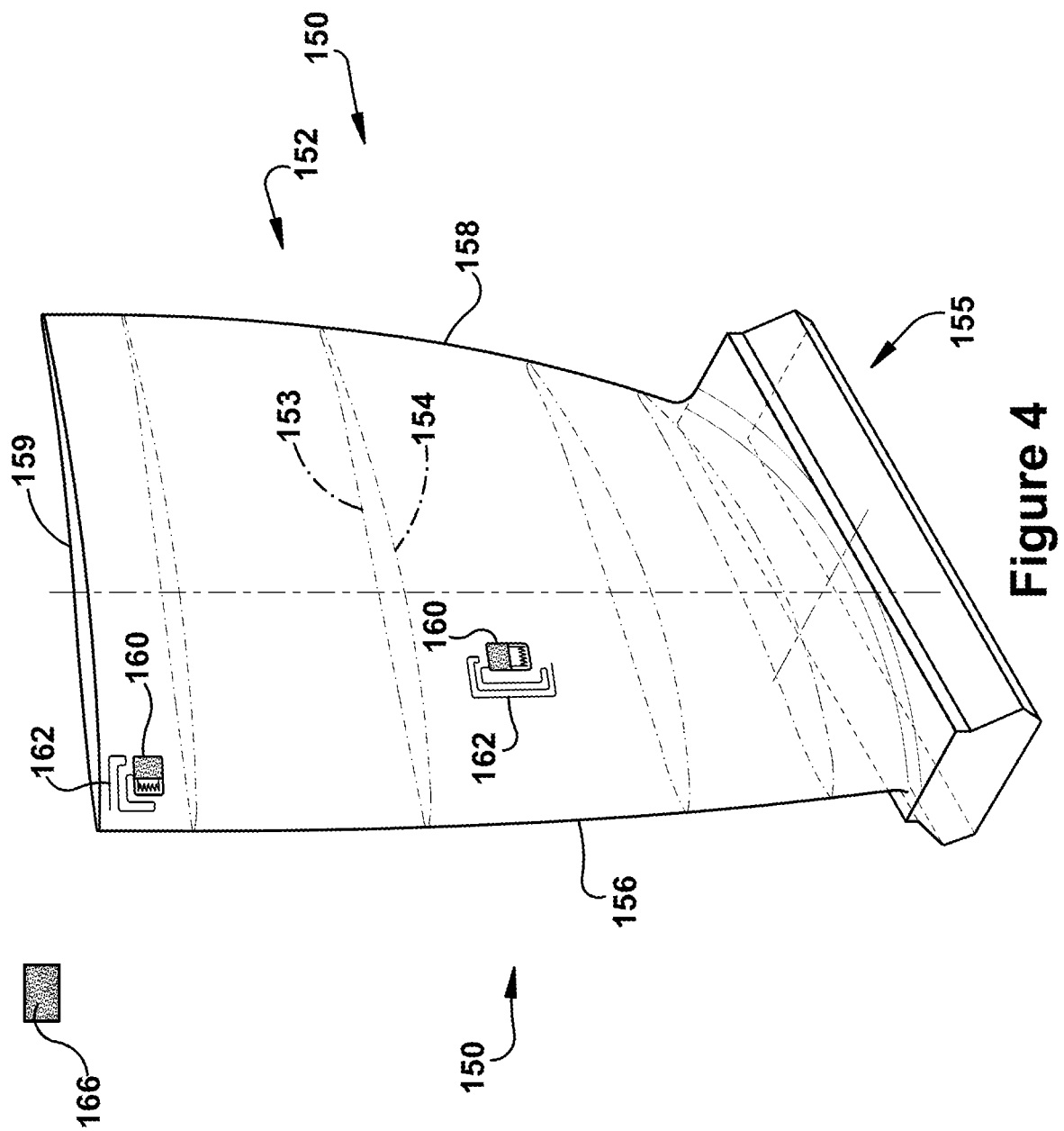
FIG. 4 is a schematic representation of an exemplary rotor blade showing the placement of RF tags and the relative location of an RF reader according to an exemplary embodiment of the present application.

Instead of the conventional probes and triggering features of known system, the present disclosure proposes affixing an RF tag to a rotor blade and then monitoring the RF tag in a particular way via an RF reader. By way of example, FIG. 4 schematically illustrates a rotor blade 150 as may be used within a turbine engine, for example, within the compressor section. The rotor blade 150 generally has several orienting features, which include an airfoil 152 that extends radially from a root 155. The airfoil 152 includes a concave pressure sidewall or pressure side 153 and a circumferentially or laterally opposite, convex suction sidewall or suction side 154. Both the pressure side 153 and the suction side 154 extend axially between a leading edge 156 and trailing edge 158. Further, the pressure side 153 and the suction side 154 extend in the radial direction between the root 155 and a radially outer blade tip (or simply "outer tip") 159.

According to example embodiments of the present disclosure, an RF tag 160 is affixed or bonded per conventional means to one or more locations on the rotor blade 150. As shown in FIG. 4 (though not depicted to scale), an RF tag 160 is applied to two different locations: 1) the approximate mid-area of the suction side of the airfoil 152; and 2) near the outer radial edge of the suction side of the airfoil 152 near the leading edge 156. These locations are exemplary, as there are other locations on a rotor blade where monitoring the information that may be collected by these tags might be advantageous. As described, the RF tag 160 may include conventional circuitry and an antenna 162 for receiving and transmitting data. As an example, the RF tag 160 may be affixed to the rotor blade 150 by being laminated between outer sheets or layers or coatings so that the electronic features of the RF tag 160 are protected from the conditions within the turbine engine. Other ways for affixing the RF tag 160 to the rotor blade 150, such as thermal spray deposition, are also possible.

Within the compressor or turbine, RF tags 160 may be applied to each of the rotor blades in a particular row or rows, or in accordance with other embodiments, only selected blades may be monitored with a row as representative of the overall health of the row. As explained more below, an RF reader 166 may be suitably provided within the compressor or turbine at a distance so that it is able to read the RF tags 160 on the rotating blades as they pass by. In accordance with preferred embodiments, the RF tag 160 is a passive RF tag so that it communicates with the RF reader 166 without requiring an internal power supply. The RF tag 160 may be small and configured to be minimally intrusive and able to withstand the harsh turbine environment for suitable durations. As will be appreciated, the RF tag 160 includes circuitry that allows it to receive the RF wave transmitted by an antenna of the RF reader 166. Once received, the RF tag may be configured to alter the frequency of the RF wave to a known or expected frequency so that the return signal identifies the particular RF tag. Other conventional ways for identifying the source of an RF return signal may also be used.

Figure 5:
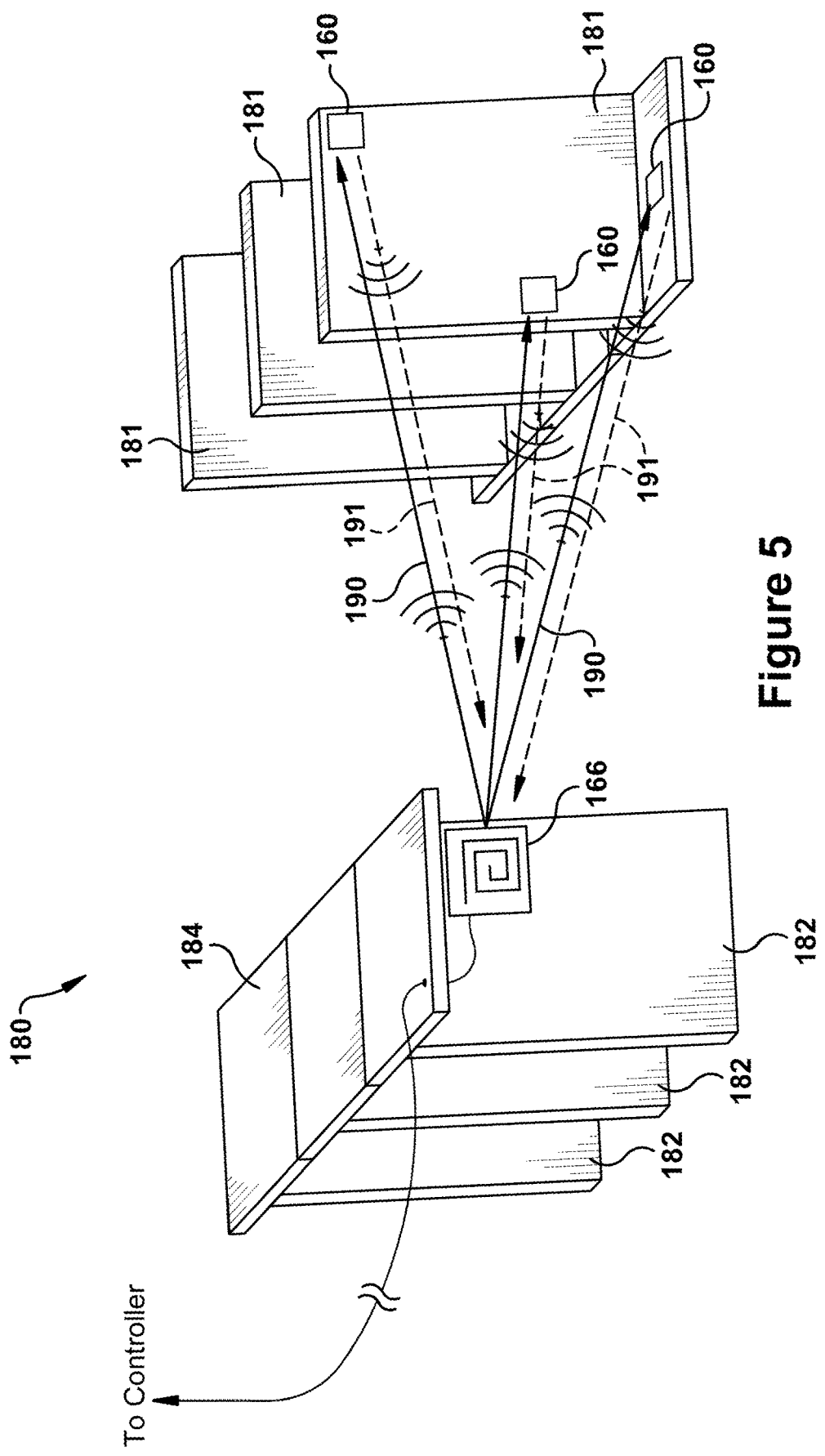
FIG. 5 is a schematic representation of an RF system according to an exemplary embodiment of the present application.

With reference now to FIG. 5, an exemplary RF system 180 is provided in accordance with aspects of the present disclosure. The RF system 180, which may also be referred to as an RF blade timing system, may operate in a turbine engine environment that, for example, includes a row of stator blades 182 and rotor blades 181. The stator blades 182 are attached to a casing 184 and remain stationary, while the rotor blades 181 are attached to a rotor disc and rotate about the central axis of the engine. According to exemplary embodiments, the RF system 180 includes one or more RF tags 160 affixed to one or more of the rotor blades 181. The RF tags 160 may be passive. The RF system 180 further may include one or more RF readers 166. Each of the RF readers 166 may be mounted per conventional means to any non-rotating surface within the turbine engine that resides a suitable distance from the rotating RF tags 160 during operation. As shown, for example, the RF reader 166 may be attached to a stator blade 182, such as, for example, one of the compressor stator blades 122 or turbine stator blades 128 shown in FIGS. 1 through 3. Alternatively, the RF reader 166 may be attached to the casing 184, for example, the compressor casing 123 or turbine casing 129 shown in FIGS. 1 through 3.

As described above, the RF reader 166 may function by producing an RF wave or signal 190 that creates an electromagnetic interrogation field. The RF reader may also be configured to receive a return RF signal 191 from the RF tags 160. It should be appreciated that the RF reader 166 of the present disclosure includes cases in which the described functionality of the RF reader 166 is achieved via multiple devices at different locations—such as one device to generate the RF signal and another to receive the return RF signals—and the description and illustration of a single device as the RF reader 166 is exemplary only. The RF tags 160 may be configured to produce the return RF signal 191 in response to entering the interrogation field created by the RF reader 166.

Figure 6:
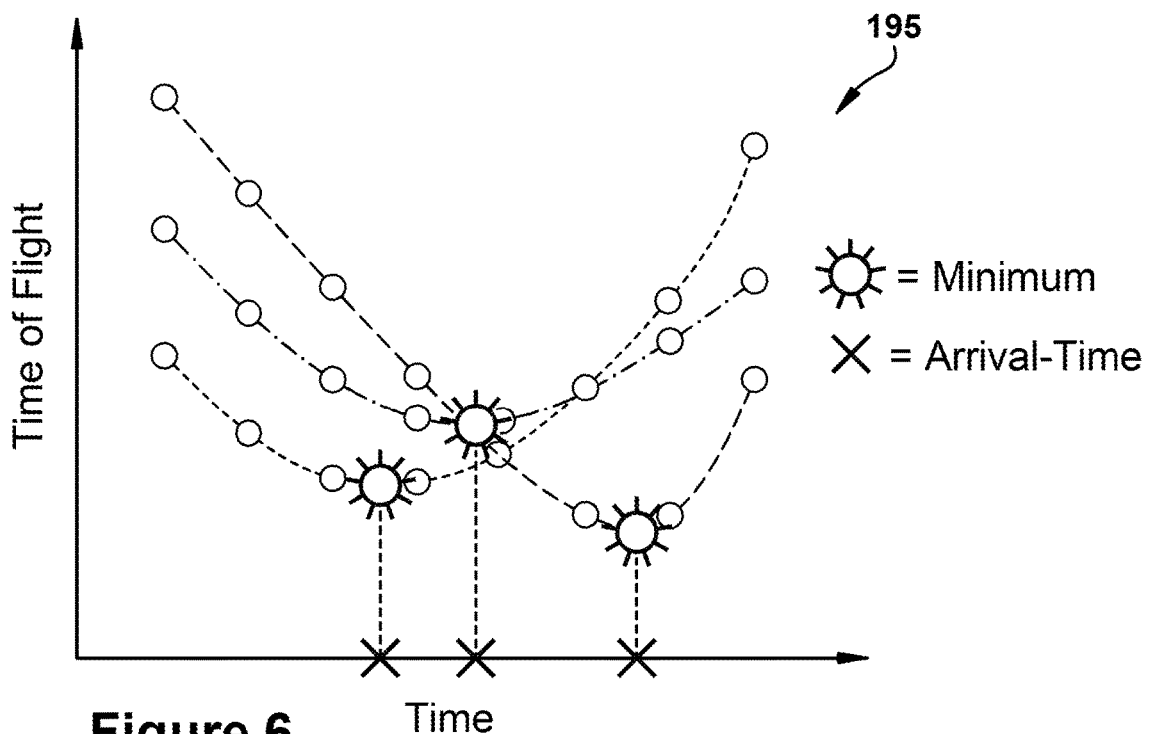
FIG. 6 shows an exemplary time domain plot demonstrating a method in accordance with the present application.

With reference also to FIG. 6, an exemplary embodiment of the present disclosure includes an RF system, such as the above-described RF system 180, which functions in the following manner. For the sake of clarity, exemplary operation of this embodiment will be described in reference to a single "RF reader" that functions in relation to a single "RF tag" affixed to a single "rotor blade". It should be appreciated, however, that in use, the exemplary RF system would typically include several RF readers and multiple RF tags affixed to multiple rotor blades, with each of the multiple RF tags functioning in the same manner in relation to each of the several RF readers as that described for the single RF tag in relation to the single RF reader. Also, for descriptive purposes, the rotor blade may be described as rotating about the central axis of the turbine engine along a "path-of-rotation".

In accordance with exemplary embodiments, the RF reader may be suitably positioned on a stationary surface in the turbine engine for monitoring the RF tag. In accordance with a preferred embodiment, the RF reader is configured to alternate between two operating modes: a signal generating mode (or simply, "signaling mode"); and a return signal listening mode (or simply, "listening mode"). In accordance with exemplary embodiments, the RF reader initially operates in the signaling mode. Specifically, the RF reader produces or emits an RF signal in a discrete burst or ping. This RF signal or ping constitutes an RF way having a known or predetermined frequency. Once generated, the ping travels from the RF reader toward the RF tag affixed to the rotor blade. After generating this ping, the RF reader switches from the signaling mode to the listening mode.

In accordance with exemplary embodiments, the RF tag is a passive RF tag. Thus, when the RF wave of the ping reaches the RF tag, it induces the RF tag to emit a return RF signal. The RF tags may be configured to alter the frequency of the RF wave of the ping in the return RF signal. In accordance with exemplary embodiments, the RF tag alters the frequency of the RF wave in a unique way so that the altered frequency of the return RF signal identifies it as having come from the RF tag. As stated, after generating the ping, the RF reader switched from the signaling mode to the listening mode in order to receive the return RF signal that is expected from the RF tag. The RF reader waits in listening mode and receives the return RF signal from the RF tag when it arrives.

According to exemplary embodiments, a next step is to calculated a "time-of-flight" for the RF wave that traveled from the RF reader to the RF tag and back. Thus, as used herein, the time-of-flight is the time occurring between when the ping was sent by the RF reader and when the corresponding return RF signal was received from the RF tag by the RF reader. To do this, the precise time at which the ping was generated by the RF reader and the precise time at which the corresponding return RF signal is received by the RF reader is recorded. From these two recorded events, the time-of-flight is determined as the delay occurring between them. Thus, time-of-flight represents the duration of time for the RF wave of the ping to travel from the RF reader to the RF tag plus the duration of time for the return signal to travel from the RF tag to the RF reader. Put another way, the time-of-flight is the duration of time occurring between generating the ping and receiving the return RF signal. In accordance with exemplary embodiments, the time-of-flight may be calculated by the RF reader, a computer-implemented controller operably connected via a communication link with the RF reader, such as, for example, the controller 200 discussed below in relation to FIG. 9, or a computer-implemented controller integrated within the RF reader, whether locally or remotely integrated, such as for example, the controller 200 of FIG. 9, or some combination thereof.

The method continues by repeating this "ping and listen" process in extremely short time intervals. By doing this, the time-of-flight data for the RF tag can be collected and plotted in the time domain. As will be appreciated, observing this time-of-flight data in the time domain will show a decreasing time-of-flight as the RF tag on the rotor blade approaches the stationary RF reader, which is followed by an increasing time-of-flight as the RF tag moves away from the stationary RF reader. In accordance with exemplary embodiments, the point at which the time-of-flight for the RF tag reaches a minimum represents the point in time at which the RF tag has drawn closest to the RF reader as the rotor blade passes by. In accordance with exemplary embodiments, this point in time is deemed the "arrival-time" for the rotor blade or, more particularly, the arrival-time of the specific portion of the rotor blade to which the RF tag is affixed.

The "arrival-time" for the RF tag can be recorded by multiple RF readers, which are configured to operate like the RF reader, as the RF tag/rotor blade revolves about the working fluid flowpath of the turbine. The "arrival-time" data gathered by the multiple RF readers can then be input into standard blade timing algorithms to determine the vibrational response, including amplitude and frequency, of the rotor blade during operation.

For example, FIG. 6 includes a plot 195 of arrival-time data for three rotor blades having three RF tags, respectively, which are passing by a stationary RF reader. The above-described "ping and listen" process may be repeated by the RF reader and the resulting time-of-flight data for the three rotor blades may be plotted in the time domain. As shown, in plot 195, the X-axis represents "Time" while the Y-axis represents "Time-of-Flight". For each of the three rotor blades, the point in time at which the RF tag comes closest to the stationary RF reader can be determined as the point in time that corresponds to the minimum time-of-flight. In general, time-of-flight data plotted in the time domain will have a general "U" or "V" shape, decreasing as the rotor blade approaches the stationary RF reader before reaching a minimum value, and then increasing as the rotor blade moves away. In accordance with exemplary embodiments, the minimum time-of-flight may be determined by mathematically estimating the minimum time-of-flight given nature of the time domain plot. Alternatively, the step of determining the minimum time-of-flight may include selecting the time-of-flight having a least value from among collected time-of-flight data points.

Once the minimum time-of-flight is found, the corresponding time on the X-axis can be deemed as the arrival-time for the particular rotor blade. From this, using a speed signal of the rotor or other techniques, it can then be determined if the arrival-time of the each of the rotor blades indicates whether it is "on-time", "early", or "late", and, in regard to the latter two, the extent to which the rotor blade is early or late. As will be appreciated, once such arrival-time data is known for each of the rotor blades, it can then be input into industry standard algorithms from which is derived the vibrational response of the rotor blades, which can serve as an indicator of blade health and/or detect the presence of defects.

In accordance with exemplary embodiments, when multiple RF tags are used, each may be configured to alter the RF signal wave to a different frequency in the return RF signal, which may be used to differentiate between multiple return signals so that a source RF tag is ascertained for each. The RF reader may distinguish between multiple return signals issuing from multiple RF tags disposed on different rotor blades and/or multiple RF tags disposed on different regions of the same rotor blade. Thus, as depicted in FIG. 6, the RF reader may receive multiple return signals that were sent from multiple RF tags in response to the same ping and, in each case, discern the particular RF tag to which each corresponds. Another advantage of the return signal frequency shift is that if the RF reader receives an RF signal that is the same frequency as the ping (i.e., the RF signal generated by the RF reader), it can be assumed that it is merely a reflection occurring within the turbine, and not a return RF signal from one of the multiple tags.

Thus, for example, exemplary methods and systems for determining an arrival-time of a rotor blade may include using a "time-of-flight" criteria in conjunction with an RF reader attached to a stationary surface and an RF tag attached to a rotor blade. During the operation of the turbine engine, time-of-flight data points may be collected via an RF monitoring process (also "time-of-flight RF monitoring process") that includes: emitting an RF signal from the RF reader; recording a first time as being when the RF signal is emitted by the RF reader; receiving the RF signal at the RF tag and emitting a return RF signal by the RF tag in response thereto; receiving the return RF signal at the RF reader; recording a second time as being when the return RF signal is received at the RF reader; and determining the time-of-flight data point as being a duration occurring between the first time and the second time. The RF monitoring process may be repeated until multiple time-of-flight data points are collected. Then a minimum time-of-flight may be determined from the multiple time-of-flight data points, and, from the minimum time-of-flight, the arrival-time for the rotor blade is determined as being a time that corresponds to the minimum time-of-flight. In accordance with exemplary embodiments, the monitoring process may be repeated so that the multiple time-of-flight data points includes at least: a plurality of the time-of-flight data points as the rotor blade nears the RF reader; and a plurality of the time-of-flight data points as the rotor blade moves away from the RF reader. The multiple time-of-flight data points may include a series of the time-of-flight data points taken sequentially during a portion of a single revolution of the rotor blade along the path-of-rotation. Finally, the method may be repeated such that a set of arrival-time dataset is collected, wherein the dataset includes multiple arrival-times calculated for different revolutions of the rotor blade about the path-of-rotation, respectively. The arrival-time dataset may then be used to calculate a vibrational response of the rotor blade.

Figure 7:
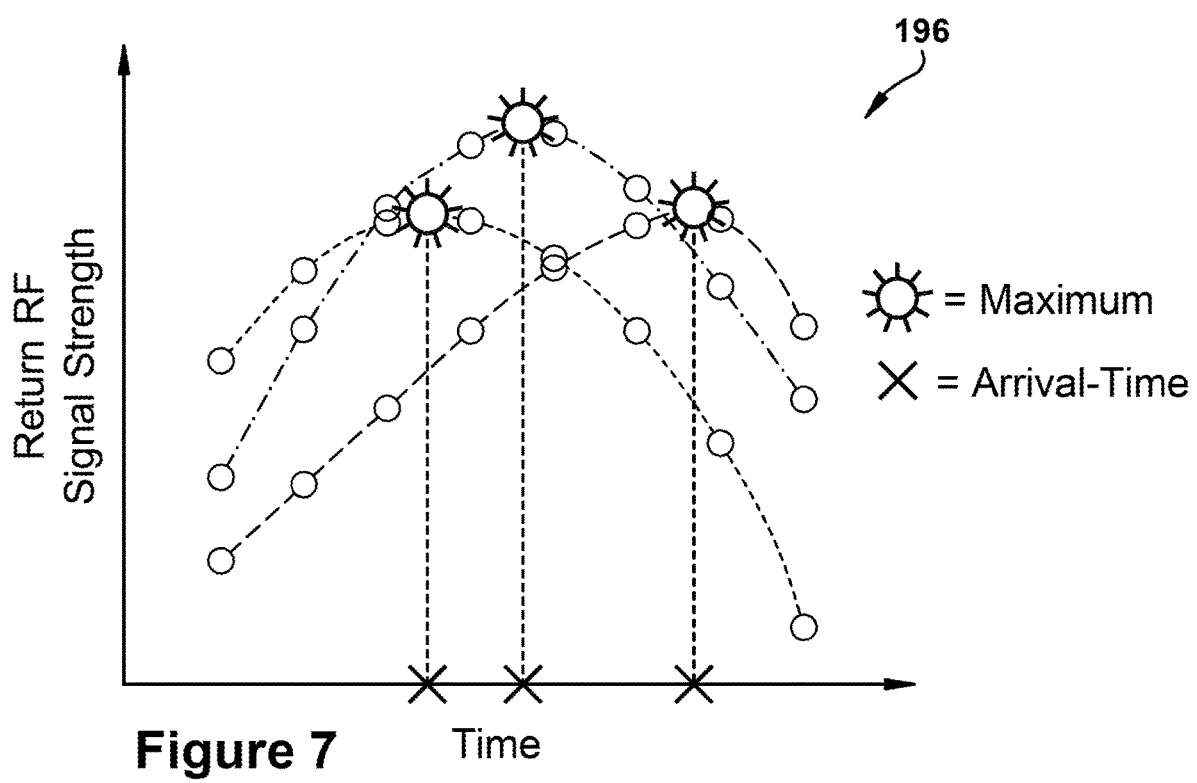
FIG. 7 shows an exemplary time domain plot demonstrating an alternative method in accordance with the present application.

With reference now to FIG. 7, an alternative embodiment of the present disclosure will now be described. As will be seen, with this embodiment, an RF system, such as the above-described RF system 180, is operated in a different manner for collecting arrival-time data for passing rotor blades. Again, for the sake of clarity, exemplary operation for this embodiment will be described in relation to a single RF reader that functions in relation to a single RF tag affixed to a single rotor blade. It should be understood, though, that several RF readers and multiple RF tags affixed to multiple rotor blades may also be used.

In accordance with the present embodiment, the RF reader is suitably positioned on a stationary surface in the turbine engine for monitoring the rotor blade. In this case, however, instead of the RF reader being configured to alternate between a signaling mode and a listening mode, the RF reader is configured to emit an RF signal continuously or at very short time intervals while, at the same time, listening continuously for the return RF signal from the RF tag, which, as before, may be a passive RF tag. The continuous or short interval RF signal from the RF reader induces a similar formatted return RF signal form the RF tag, which is received by the RF reader, which, as stated, is listening continuously. Similar to the above-described embodiment, the RF tag may be configured to alter the frequency of the RF wave in the return RF signal so that the source of the return RF signal may be determined by the RF reader.

Instead of using variations in "time-of-flight" to determine arrival-time, the present embodiment uses variations in the magnitude or signal strength (also "strength-of-signal") of the return RF signal. As will be appreciated, the signal strength of the return RF signal is a function of several factors, including, primarily, the distance between the RF tag and the RF reader. During the course of a revolution, the RF reader monitors the varying signal strength of the return RF signal and records the values thereof. For example, as the rotor blade moves closer to the RF reader, the signal strength of the return RF signal increases in magnitude and, as the rotor blade moves away from the RF reader, the signal strength decreases in magnitude. Plotting the signal strength in time domain, the shape of the curve thus resembles an upside-down "U" or "V"—the inverse of the above "time-of-flight" plot of FIG. 6.

In accordance with the present embodiment, the maximum signal strength is used to indicate the arrival-time of the rotor blade. That is, the point at which the signal strength for the RF tag reaches a maximum represents the point in time at which the RF tag comes closest to the RF reader as the rotor blade passes by. This point in time becomes the "arrival-time" of the rotor blade or, more particularly, becomes the arrival-time of the particular region of the rotor blade to which the RF tag is affixed. As before, such "arrival-time" data can be measured and recorded for the rotor blade by multiple RF readers positioned about the working fluid flowpath. The "arrival-time" data collected by the multiple RF readers in this manner can then be input into standard blade timing post-processing algorithms to determine the vibrational response of the rotor blade.

With specific reference to FIG. 7, a plot 196 is shown of arrival-time data for three rotor blades having three RF tags, respectively, which are passing by a stationary RF reader. As described above, the process of continuously (or at very short intervals) emitting and listening may be performed by the RF reader and the resulting strength-of-signal data for the return RF signal strength of the three RF tags may be plotted in the time domain. As indicated in the plot 195, the X-axis represents "Time" while the Y-axis represents "Return RF Signal Strength". For each of the three RF tags, the point in time at which each comes closest to the stationary RF reader can be determined as the time on the X-axis that corresponds to the maximum value of the return RF signal strength. In each case, once the maximum signal strength of the return RF signal is found, the corresponding time on the X-axis is deemed the arrival-time. From this, using a speed signal of the rotor or other techniques, it can then be determined if the arrival-time of the rotor blade indicates whether the rotor blade is "on-time", "early", or "late", and, in regard to the latter two, the extent to which the rotor blade is early or late. And, as in the above example, once such arrival-time data is known for each of the rotor blades, it can then be input into industry standard algorithms that derive the vibrational response of each of the rotor blades, which can serve as an indicator of blade health and/or detect the presence of defects. Finally, in accordance with exemplary embodiments, when multiple RF tags are used, each may be configured to alter the RF signal wave to a different frequency, which may be used to differentiate between multiple return signals so that a source RF tag can be ascertained for each.

Thus, for example, exemplary methods and systems for determining an arrival-time of a rotor blade may include using a "strength-of-signal" criteria in conjunction with an RF reader attached to a stationary surface and an RF tag attached to a rotor blade. During the operation of the turbine engine, strength-of-signal data points may be collected via an RF monitoring process (also "strength-of-signal RF monitoring process") that includes: emitting an RF signal from the RF reader; receiving the RF signal at the RF tag and emitting a return RF signal by the RF tag in response thereto; receiving the return RF signal at the RF reader; measuring a signal strength of the return RF signal as received by the RF reader; and determining the strength-of-signal data point as being equal to the measured signal strength. The RF monitoring process may be repeated until multiple strength-of-signal data points are collected. Then a maximum strength-of-signal may be determined from the multiple strength-of-signal data points, and, from the maximum strength-of-signal, the arrival-time for the rotor blade is determined as being a time that corresponds to the maximum strength-of-signal. In accordance with exemplary embodiments, the monitoring process may be repeated so that the multiple strength-of-signal data points includes at least: a plurality of the strength-of-signal data points as the rotor blade nears the RF reader; and a plurality of the strength-of-signal data points as the rotor blade moves away from the RF reader. The multiple strength-of-signal data points may include a series of the strength-of-signal data points taken sequentially during a portion of a single revolution of the rotor blade along the path-of-rotation. Finally, the method may be repeated such that an arrival-time dataset is collected, wherein the arrival-time dataset includes multiple arrival-times calculated for different revolutions of the rotor blade about the path-of-rotation, respectively. The arrival-time dataset may then be used to calculate a vibrational response of the rotor blade.

Figure 8:
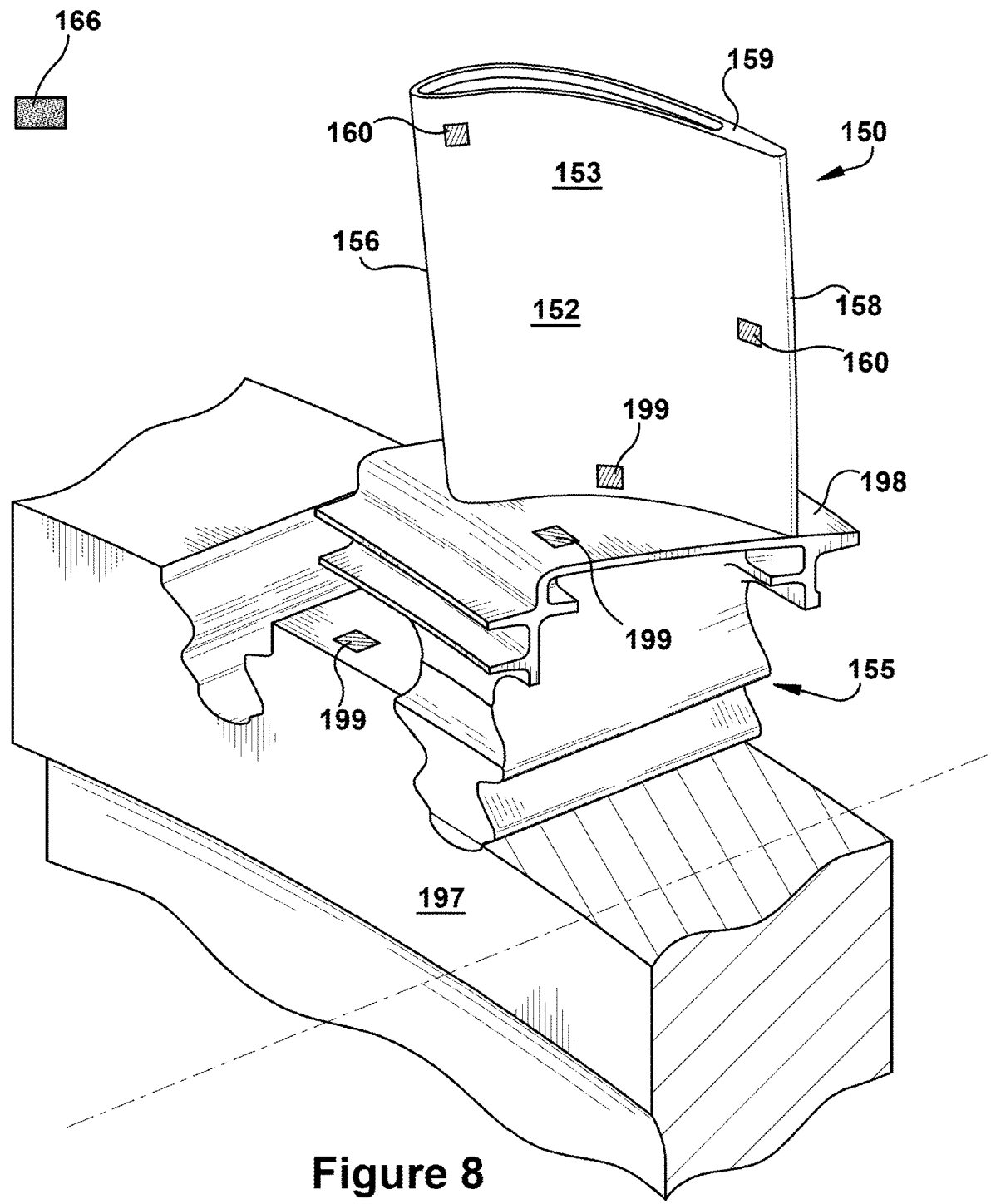
FIG. 8 is a schematic representation of an exemplary rotor blade showing the placement of RF tags and the relative location of an RF reader according to an alternative embodiment of the present application.

With reference now to FIG. 8, another embodiment of the present disclosure is illustrated, which will be discussed in relation to a rotor blade 150 that, for example, may be a rotor blade used in the turbine section of a gas turbine or steam turbine engine. As will be seen, in this case, the RF system includes one or more reference RF tags, which are added to the system so to improve certain aspects relating to arrival-time data collection.

Similar to the example of above, the rotor blade 150 may have the same general orienting features, which include an airfoil 152 that extends radially between a root 155 and an outer tip 159. The airfoil 152 may also include a pressure side 153 and a suction side 154 extending between a leading edge 156 and a trailing edge 158. As also shown in FIG. 8, the root 155 of the rotor blade 150 may connect to a rotor wheel 197. Further, the root 155 includes a platform 198, which is the substantially flat surface from which the airfoil 152 extends. As will be appreciated, the platforms 150 of adjacent rotor blades 150 abut to define the inner radial boundary of the working fluid flowpath.

According to the present embodiment, one or more RF tags 160 may be affixed to one or more locations on the rotor blade 150. In accordance with preferred embodiments, the one or more RF tags 160 are disposed on the airfoil 152 in regions of the airfoil 152 that are less rigid and deflect more during operation. For example, as illustrated, an RF tag 160 may be secured to: 1) the approximate mid-area of the pressure side 153 of the airfoil 152 near the trailing edge 158 and 2) near the outer tip 159 of the pressure side 153 of the airfoil 152 near the leading edge 156. These locations are exemplary, as there are other locations on a rotor blade where monitoring via additional RF tags may be advantageous.

In accordance with the present embodiment, one or more additional RF tags, which will be referred to herein as "reference RF tags 199", are affixed to one or more rotating components near the RF tags 160 for the purposes of improving the performance of the blade timing systems and methods disclosed above. According to preferred embodiments, the reference RF tags 199 may be affixed to more rigid portions of the rotor blade 150 and/or other rigid rotating structure that is near the position of the RF tags 160. In general, as will be seen, the reference RF tag 199 may be used to provide a baseline or reference arrival-time against which the arrival-time of the other RF tags 160 may be compared.

Broadly, the reference RF tags 199 may be positioned on any rotating structure near one of the RF tags 160. In regard to preferred locations for the reference RF tag 199, as stated, these may include rigid rotating structure near the location of the RF tags 160. For example, as shown in the exemplary embodiment of FIG. 8, a first possible location for the reference RF tag 199 is the inner radial portion of the airfoil 152. As will be appreciated, the rigidity of the airfoil 152 increases as it nears the root 155, making this position near the root desirable. A second possible location for the reference RF tag 199 is a position on the root 155 of the rotor blade 150. As illustrated, for example, the reference RF tag 199 may be attached to the platform 198 of the root 155. Other locations on the root 155 are also possible, such as the underside of the platform 198 or the shank portion that extends between the platform 198 and a dovetail connector that is used to attach the rotor blade 150 to the rotor wheel 197. A third possible location for the reference RF tag 199 is on the rotor wheel 197. In this case, as shown, the reference RF tag 199 may be placed on the outer circumference of the rotor wheel 199 so that it approximately circumferentially coincides or aligns with the rotor blade 150 on which the RF tags are located. In use, the reference RF tags 199 may be utilized in the same general manner described above in relation to the RF tags 160. That is, arrival-time data may be collected for the reference RF tags 199 using either the "time-of-flight" or "signal strength" methods.

When the arrival-time for a particular region of the rotor blade—such as the outer tip of the airfoil—is determined (either by conventional probes or the RF systems described herein), there remains an additional requirement of knowing an actual arrival-time for the rotor blade for the sake of comparison. In this way it can be determined if the arrival-time of the particular region is "on-time", "early", or "late", and from this, the vibrational response of the rotor blade can be derived. Conventional blade timing techniques generally determine the actual arrival-time of the rotor blade by referring to a rotor speed parameter, i.e., the measured speed of the rotor wheel to which the rotor blade is attached. However, there are several drawbacks to this. First, rotor speed is measured via a sensor that is part of separate control system of the turbine engine and, in order to access the rotor speed values for the purposes of blade timing requires some set-up and reconfiguration. Second, even when such communications reconfiguration is achieved, the measuring of rotor speed is a slower process that introduces a delay or lag to blade timing. Third, the measurement of rotor speed is generally not as precise as desired for blade timing purposes, which introduces level of uncertainty to the results.

With the proposed use of a reference RF tag, the need for referring to rotor speed or other sensor measurements to determine the actual arrival-time of the rotor blade is removed. Specifically, the actual arrival-time of the rotor blade—against which the arrival-time of the other RF tags can be compared—is determined by the reference RF tag. To do this, the reference RF tag is disposed on rigid rotating structure near the other RF tags so that the reference RF tag's arrival-time can be assumed as the real or, as used herein, "actual arrival-time" for the rotor blade itself. As describe above, preferred locations for the reference RF tag include the inner radial portions of the airfoil, the platform or root, and/or rotor wheel.

In accordance with present embodiment, RF blade timing systems of the present disclosure may include one or more RF readers and one or more rotor blades, which each includes one or more RF tags and one or more reference RF tags, which, for the sake of clarity, may be described with reference to a single RF reader, rotor blade, RF tag, and reference RF tag. In use, the arrival-time of the reference RF tag and the RF tag may be calculated by the RF reader via either the time-of-flight RF monitoring process, the strength-of-signal RF monitoring process, as described above, or some other. The arrival-time calculated for the reference RF tag may be designated the actual arrival-time for the rotor blade. Then, by comparing this to the arrival-time calculated for the RF tag, it can be determined whether the RF tag arrived on-time or the extent to which it arrived early or late or, put another way, led or lagged relative to the arrival-time of the rotor blade. As will be appreciated, for example, if the RF tag is located at the outer tip, an early or late arrival ma indicate a deflection occurring through the airfoil in response to operating vibration. Once such arrival-time data is known—i.e., the extent to which the RF tag is early, on-time, or late in relation to the reference RF tag—the data can be input into industry standard algorithms that derive the vibrational response of the rotor blade. It should further be understood that reference RF tags may be similarly used to compare arrival-time data between any two different rotating components or different regions of a rotating component.

Thus, for example, exemplary methods and systems for determining an arrival-time of a rotor blade may include using a reference RF tag in conjunction with an RF reader attached to a stationary surface and an RF tag attached to a rotor blade. The RF tag may be attached to a first region of the rotor blade, while the reference RF tag is attached to a rotating structure near the RF tag. In use—for example, in relation to a first revolution of the rotor blade occurring during the operation of the turbine engine—the arrival-time for each of the RF tag and the reference RF tag may be collected with the RF reader via an RF monitoring process, which may include the time-of-flight RF monitoring process or the strength-of-signal RF monitoring process. The arrival-time of the RF tag may be compared to the arrival-time of the reference RF tag to determine an arrival-time test result for the first region of the rotor blade for the first revolution. In accordance with exemplary embodiments, both the RF tag and reference RF tag may be passive. As stated above, the arrival-time of the reference RF tag may be designated as an actual arrival-time for the rotor blade. The arrival-time test result for the first region of the rotor blade, thus, may indicate an amount by which the arrival-time of the first region of the rotor blade leads or lags the designated actual arrival-time of the rotor blade. The method may further include repeating the steps to collect the arrival-time test result for the first region of the rotor blade for multiple other revolutions of the rotor blade during engine operation. These may be compiled in a dataset of arrival-time test results, which then may be used to calculate a vibrational response of the rotor blade.

As will be appreciated, the above-disclosed embodiments of the present disclosure may be used for blade timing studies, including upfront validation testing of new rotor blade designs and in situ long-term rotor blade health monitoring. Blade timing systems and methods of the present disclosure can be used on both compressor rotor blades and turbine rotor blades or buckets, including turbine rotor blades in steam and combustion turbine engines, as well as any other rotating components. Unlike the hardware associated with laser probes and other sensors of conventional blade timing techniques, the RF devices required by the embodiments of the present disclosure are both inexpensive and application independent, making them reusable and further lowering implementation costs. Additionally, the required RF devices—including the RF readers and RF tags—can be implemented within the harsh turbine environment without the need of cooling air, making regular longer term testing feasible. Additional and related advantages include RF-based systems for blade timing being easier to install and implement in the field with less initial investment. Finally, systems of the present disclosure can provide far more data that is richer in content and more reliable.

Figure 9:
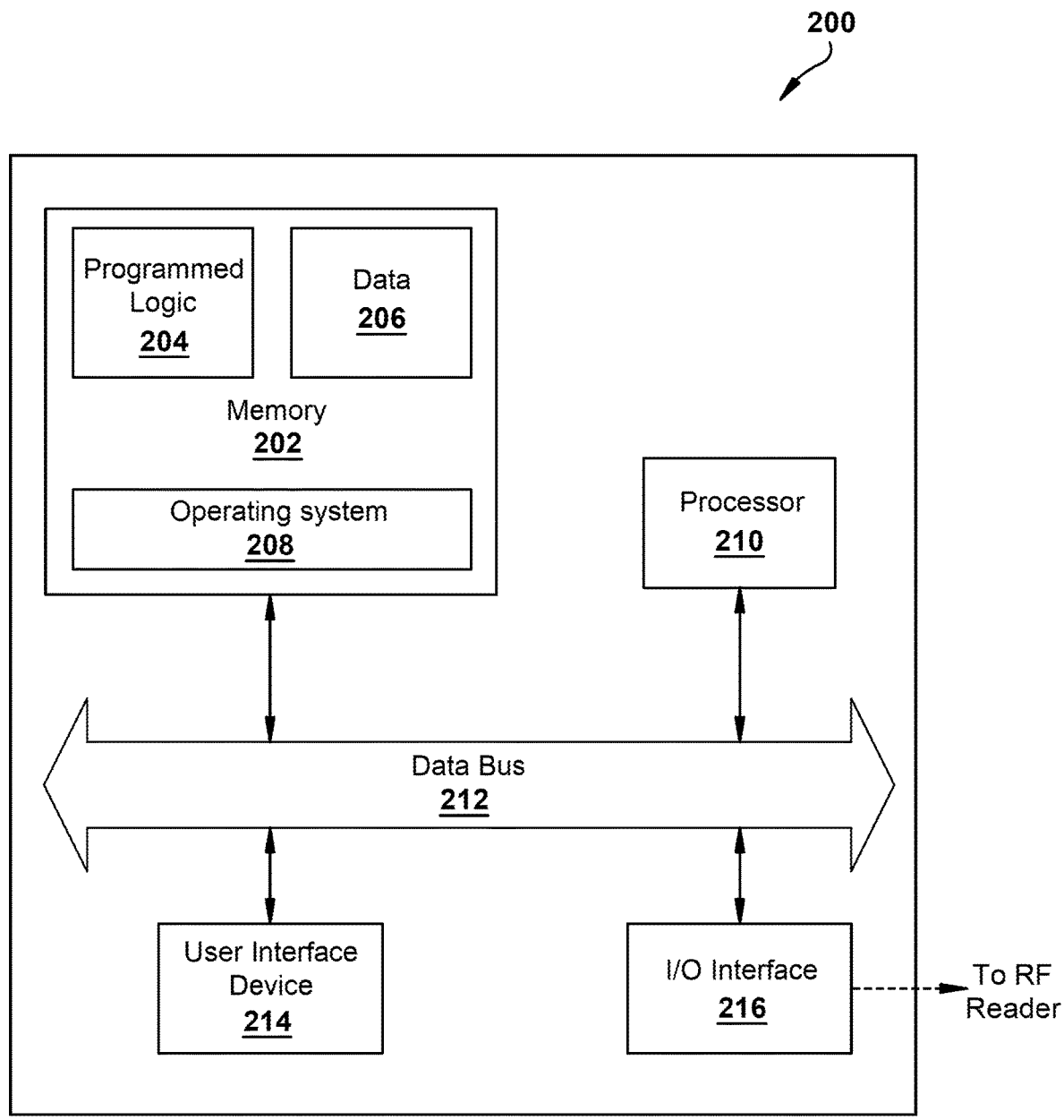
FIG. 9 shows an exemplary computer system or controller in accordance with an embodiment of the present application.

With reference now to FIG. 9, the RF blade timing system of the present disclosure may include computing and processing resources, such as a computer-implemented control system or controller 200, which may be used to implement certain embodiments of the present disclosure or components or aspects of those embodiments. For example, as indicated, the controller 200 may be communicatively linked to and/or integrated with the RF readers and, thereby, receive the data collected by the RF readers, which may include arrival-time data, time-of-flight data, and/or strength-of-signal for each of the RF tags and/or reference RF tags that are part of the RF system. The controller 200 then may process such data so to derive a vibrational response, performance or health characteristic about the rotor blades to which the RF tags are attached. The controller 200 may be configured to automatically output the derived rotor blade characteristic to one or more other computer systems, including at least one computer system of a predetermined user connected with the design and/or operation of the rotor blades, so that an action by such user may be taken when appropriate.

As illustrated, the controller 200 may include a memory 202 that stores programmed logic 204 (e.g., software) and data 206. Memory 202 also may include an operating system 208. A processor 210 may utilize operating system 208 to execute programmed logic 204, and in doing so, may also utilize data 206. A control and data bus 212 may provide communication between memory 202 and processor 210. Users may interface with controller 200 via at least one user interface device 214, such as a keyboard, mouse, touch-screen, gesture control device, wearable computer, control panel, or any other device capable of communicating data to and from controller 200. The controller 200 may be in communication with RF equipment and its associated devices online, including sensors or data recorded from such sensors, while operating, as well as in communication with the equipment and its associated devices offline while not operating, via an input/output (I/O) interface 216. More specifically, the controller 200 may carry out the execution of instructions for, but not limited to, providing commands to certain devices, including RF readers and/or its associated devices, as provided herein, and receiving data from RF readers and/or its associated devices. The controller 200 and the programmed logic 204 implemented thereby may include software, hardware, firmware, or any combination thereof.

According to example embodiments, the included figures may reference systems, methods, processes, apparatuses, and computer program products. It should be understood that at least some of those may be implemented, at least partially, by computer program instructions, which may be loaded onto a general purpose computer, the controller 200, a special purpose computer, a special purpose hardware-based computer, or other programmable data processing apparatus to produce a machine, such that the instructions, which execute on the computer or other programmable data processing apparatus, create means for implementing the functionality of at least some of the methods discussed herein. The computer program instructions mentioned herein may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process, such that the instructions that execute on the computer or other programmable apparatus provide steps for implementing the functions specified in the block or blocks. One or more components of the systems and one or more elements of the methods described herein may be implemented through an application program running on an operating system of a computer. They also may be practiced with other computer system configurations, including hand-held devices, multi-processor systems, microprocessor based or programmable consumer electronics, mini-computers, mainframe computers, and so forth.

As one of ordinary skill in the art will appreciate, the many varying features and configurations described above in relation to the several exemplary embodiments may be further selectively applied to form the other possible embodiments of the present disclosure. For the sake of brevity and taking into account the abilities of one of ordinary skill in the art, all of the possible iterations is not provided or discussed in detail, though all combinations and possible embodiments embraced by the several claims below are intended to be part of the present application. In addition, from the above description of several exemplary embodiments, those skilled in the art likely will perceive improvements, changes and modifications. The appended claims are intended to cover such improvements, changes and modifications. It should be understood that numerous changes and modifications may be made to the subject matter disclosed herein without departing from the spirit and scope of the invention as defined by the following claims and the equivalents thereof.

That which is claimed:

1. A method for determining an arrival time of a rotor blade in a turbine engine, the turbine engine comprising a row of rotor blades that contains the rotor blade, wherein the rotor blade rotates about a central axis during an operation of the turbine engine along a path of rotation, the method comprising the steps of:
having a radio frequency ("RF") reader attached to a stationary surface in the turbine engine, the stationary surface being disposed in operational proximity to the row of rotor blades;
having a radio frequency identification tag ("RF tag") attached to the rotor blade;
during the operation of the turbine engine, collecting a strength-of-signal data point via an RF monitoring process, the RF monitoring process comprising the steps of:
emitting an RF signal from the RF reader;
receiving the RF signal at the RF tag and emitting a return RF signal by the RF tag in response thereto;
receiving the return RF signal at the RF reader;
measuring a signal strength of the return RF signal as received by the RF reader; and
determining the strength-of-signal data point as being equal to the measured signal strength;
repeating the RF monitoring process until multiple strength-of-signal data points are collected;
determining a maximum strength-of-signal from the multiple strength-of-signal data points; and
determining the arrival time for the rotor blade as being a time that corresponds to the maximum strength-of-signal.

2. The method of claim 1, wherein the RF tag comprises a passive RF tag.

3. The method of claim 2, wherein the RF signal comprises a first frequency; and wherein the RF tag is configured to produce the return RF signal at a second frequency that is different than the first frequency.

4. The method of claim 2, wherein the RF reader emits the RF signal continuously; and wherein the RF reader comprises a receiver antenna that listens continuously for the return RF signal from the RF tag.

5. The method of claim 2, wherein the RF reader emits the RF signal at very short intervals; and wherein the RF reader comprises a receiver antenna that listens continuously for the return RF signal from the RF tag.

6. The method of claim 2, wherein the RF tag is configured to alter a frequency in the RF signal so that the return RF signal comprises a predetermined frequency that identifies the RF tag as being a source of the return RF signal.

7. The method of claim 2, wherein the monitoring process is repeated so that the multiple strength-of-signal data points includes at least:
a plurality of the strength-of-signal data points as the rotor blade nears the RF reader; and
a plurality of the strength-of-signal data points as the rotor blade moves away from the RF reader.

8. The method of claim 7, wherein the multiple strength-of-signal data points comprises a series of the strength-of-signal data points taken sequentially during a portion of a single revolution of the rotor blade along the path of rotation.

9. The method of claim 8, the step of determining the maximum strength-of-signal from the multiple strength-of-signal data points comprises:
creating a first plot by plotting the multiple strength-of-signal data points in the time domain; and
mathematically estimating the maximum strength-of-signal given the first plot.

10. The method of claim 8, wherein the step of determining the maximum strength-of-signal from the multiple strength-of-signal data points comprises selecting the strength-of-signal data point having a highest value from among the multiple strength-of-signal data points.

11. The method of claim 7, wherein the arrival time is a parameter that defines when the rotor blade in the turbine engine reaches a predetermined point that is precisely defined on the path of rotation during the operation of the turbine engine.

12. The method of claim 2, wherein the RF reader is secured to a stator blade in the turbine engine.

13. The method of claim 2, wherein the RF tag is secured to an airfoil of the rotor blade.

14. The method of claim 13, wherein the RF tag is secured to an outer tip of the airfoil of the rotor blade.

15. The method of claim 2, wherein the turbine engine comprises a gas turbine engine, and the rotor blade comprises a rotor blade in a turbine section of the gas turbine engine.

16. The method of claim 2, further comprising the steps of:
repeating the method to collect a strength-of-signal dataset, the strength-of-signal dataset comprising multiple ones of the arrival time calculated for different revolutions of the rotor blade about the path-of-rotation, respectively; and
using the strength-of-signal dataset to calculate a vibrational response of the rotor blade.

17. A system for determining an arrival time of a rotor blade in a turbine engine, the system comprising:
the turbine engine having a row of rotor blades that contains the rotor blade, wherein the rotor blade rotates about a central axis during an operation of the turbine engine along a path of rotation;
a radio frequency ("RF") reader attached to a stationary surface in the turbine engine, the stationary surface being disposed in operational proximity to the row of rotor blades;
a radio frequency identification tag ("RF tag") attached to the rotor blade;
wherein, the RF reader and RF tag are configured to collect a strength-of-signal data point via an RF monitoring process, the RF monitoring process comprising the steps of:
during the operation of the turbine engine, collecting a strength-of-signal data point via an RF monitoring process, the RF monitoring process comprising the steps of:
emitting an RF signal from the RF reader;
receiving the RF signal at the RF tag and emitting a return RF signal by the RF tag in response thereto;
receiving the return RF signal at the RF reader;
measuring a signal strength of the return RF signal as received by the RF reader; and
determining the strength-of-signal data point as being equal to the measured signal strength.

18. The system of claim 17, wherein the RF reader and RF tag are configured to:
repeat the RF monitoring process until multiple strength-of-signal data points are collected;
determine a maximum strength-of-signal from the multiple strength-of-signal data points; and
determine the arrival time for the rotor blade as being a time that corresponds to the maximum strength-of-signal.

19. The system of claim 18, wherein the RF tag is secured to an airfoil of the rotor blade; and wherein the turbine engine comprises a gas turbine engine, and the rotor blade comprises a rotor blade in a turbine section of the gas turbine engine.

20. The system of claim 19, wherein the RF monitoring process is repeated to collect an arrival time dataset, the arrival time dataset comprising multiple ones of the arrival time calculated for different revolutions of the rotor blade about the path of rotation, respectively; and
wherein the RF monitoring process further comprises the step of using the arrival time dataset to calculate a vibrational response of the rotor blade.

* * * * *